United States Patent
Latimer, III et al.

(10) Patent No.: US 7,237,829 B2
(45) Date of Patent: Jul. 3, 2007

(54) UNITIZED VEHICLE REAR BODY STRUCTURE

(75) Inventors: John Latimer, III, West Bloomfield, MI (US); Robert Blanchard, Fenton, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 248 days.

(21) Appl. No.: 11/074,831

(22) Filed: Mar. 9, 2005

(65) Prior Publication Data

US 2006/0202519 A1   Sep. 14, 2006

(51) Int. Cl.
*B62D 25/20* (2006.01)

(52) U.S. Cl. ............ 296/187.11; 296/203.04; 280/788

(58) Field of Classification Search ......... 296/187.11, 296/203.04; 280/781, 788
See application file for complete search history.

(56) References Cited

U.S. PATENT DOCUMENTS

| | | | |
|---|---|---|---|
| 4,093,254 A | 6/1978 | Ezaki | |
| 4,969,661 A | 11/1990 | Omura et al. | |
| 5,110,177 A | 5/1992 | Akio | |
| 5,381,871 A | 1/1995 | Ohta | |
| 5,445,404 A | 8/1995 | Shida et al. | |
| 6,349,953 B1 * | 2/2002 | Yoshihira et al. | 280/124.109 |
| 6,568,747 B2 | 5/2003 | Kobayashi | |

* cited by examiner

*Primary Examiner*—Joseph D. Pape
(74) *Attorney, Agent, or Firm*—Global IP Counselors, LLP

(57) ABSTRACT

A unitized vehicle rear body structure is disclosed that includes a vehicle floor and a structural support member. The structural support member is fixed to the vehicle floor and extends longitudinally within the vehicle rear body structure. The structural support member includes a generally U-shaped support element and an upper brace. The generally U-shaped support element has a lower wall portion and a pair of generally vertical side wall portions with laterally spaced apart upper edges and lower edges coupled to lateral sides of the lower wall portion. The upper brace is fixedly attached between the side wall portions. Further, the upper brace is spaced apart upwardly from the lower wall portion and spaced below the upper edges.

22 Claims, 11 Drawing Sheets

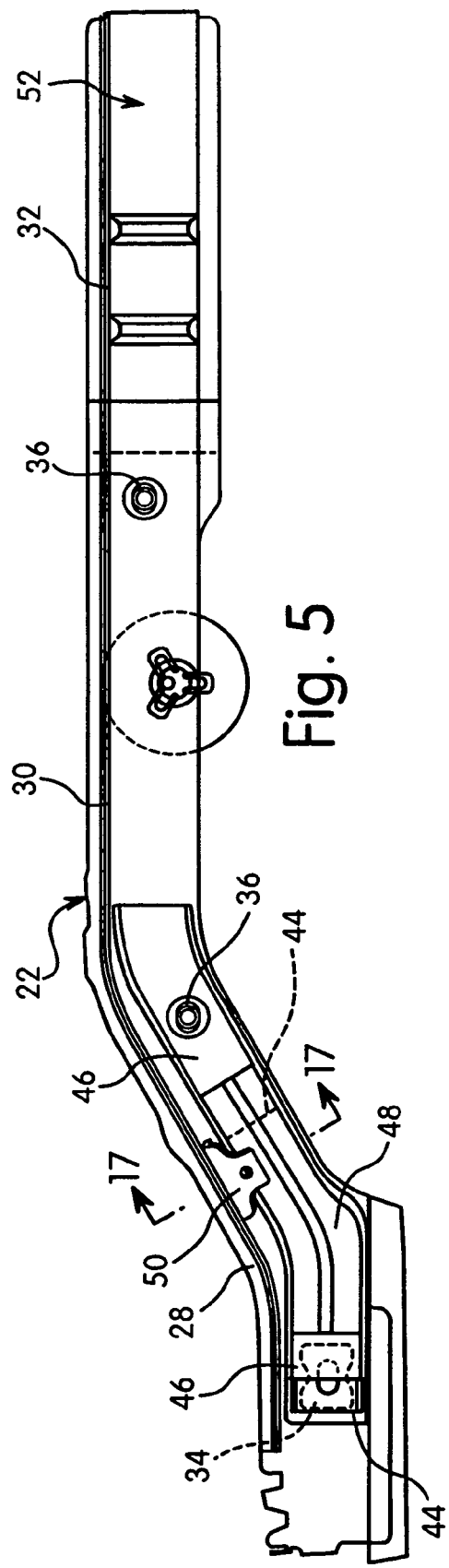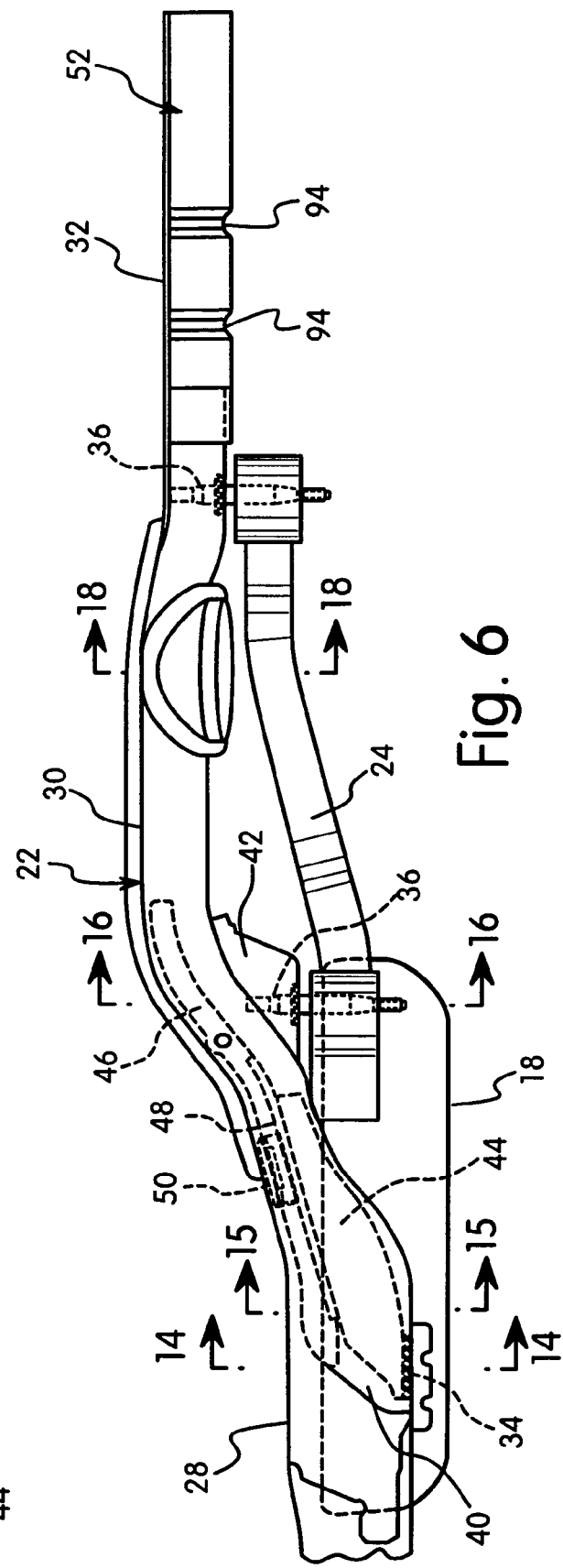

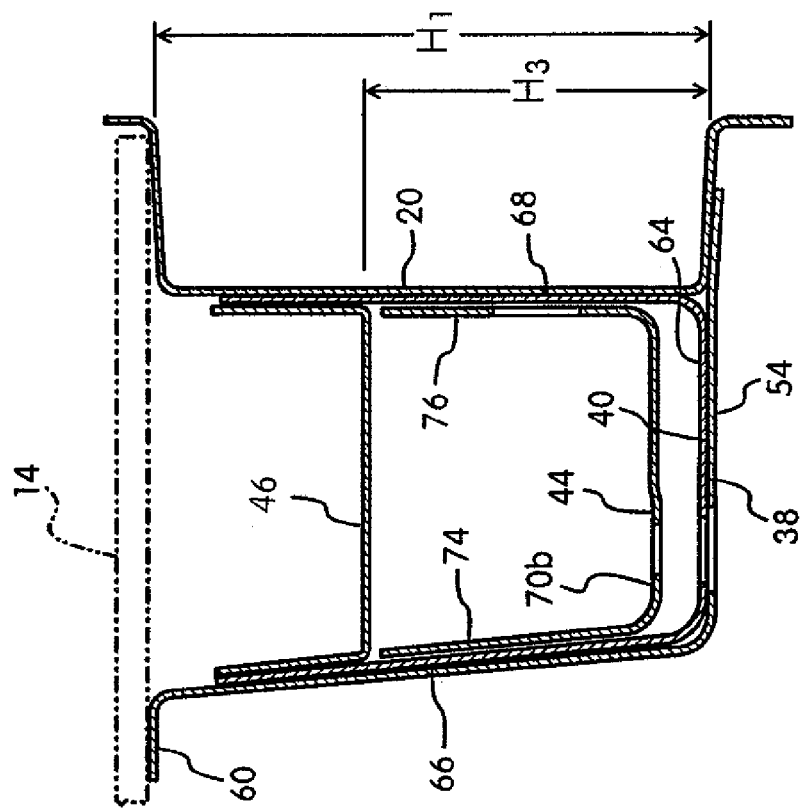
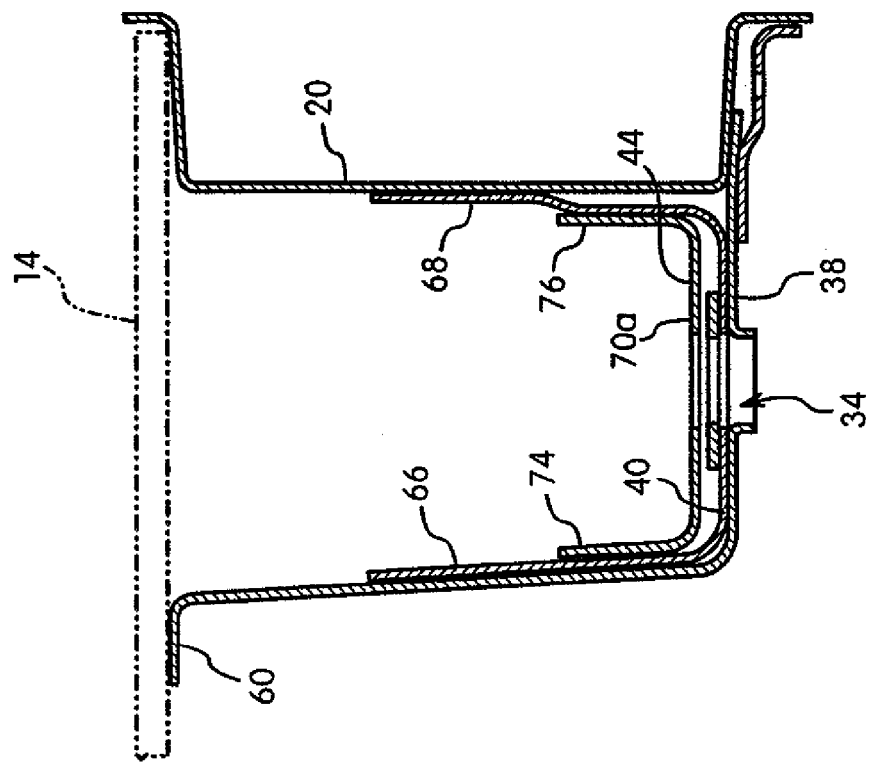

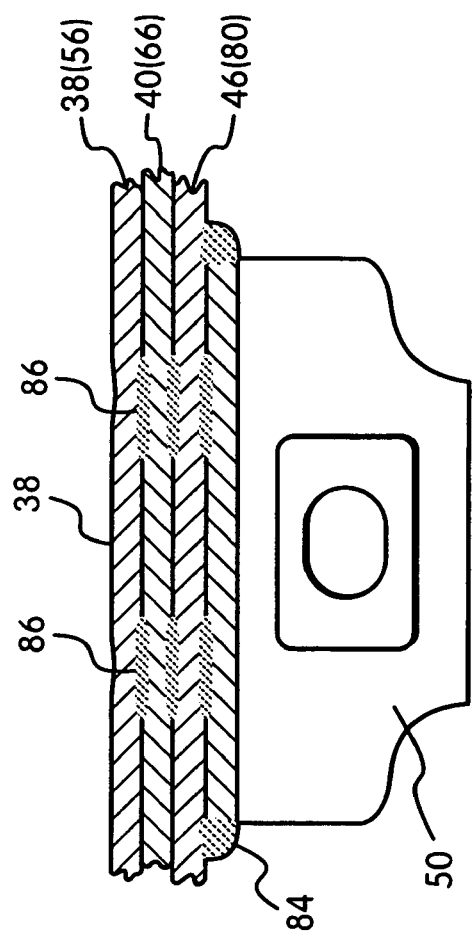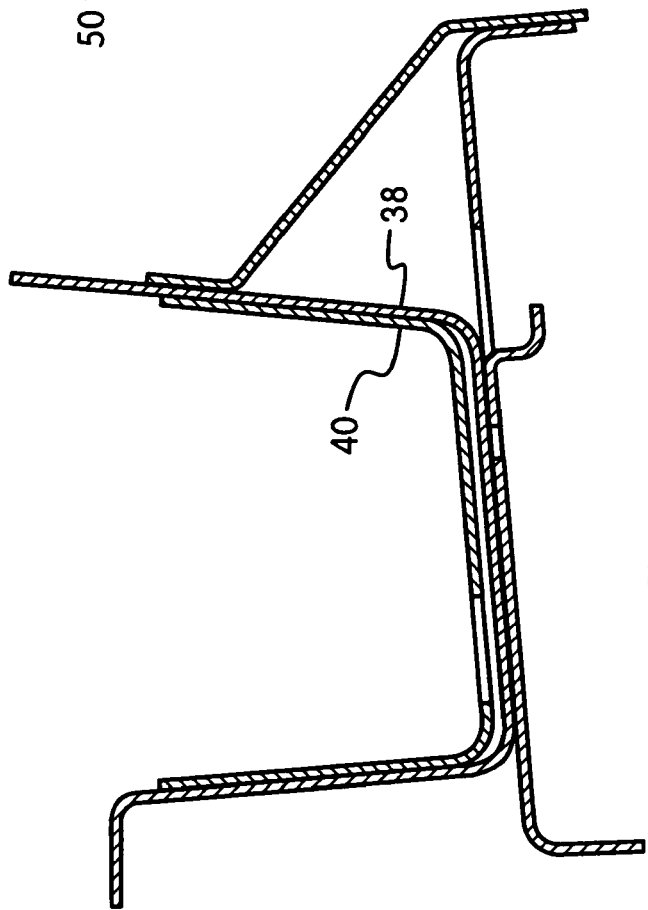

UNITIZED VEHICLE REAR BODY STRUCTURE

BACKGROUND OF THE INVENTION

1. Field of the Invention

The present invention generally relates to a unitized vehicle rear body structure. More specifically, the present invention relates to a unitized vehicle rear body structure having a longitudinally extending structural support member that is reinforced.

2. Background Information

Many vehicles utilize a conventional unitized (self-supporting) vehicle body that is built from hollow sheet metal components onto which body panels are welded. Generally, the structural configurations of these unitized vehicle bodies are continuously being improved for a variety of reasons. For instance, these unitized vehicle bodies have been extensively redesigned over the years to make the vehicles safer in order to protect passengers in the event of an accident.

One area of concern in a rear impact is the protecting the fuel tank. In order to prevent damage to the fuel tank as a result of a rear impact it is desirable to have a rigid vehicle support structure surrounding the fuel tank. However, it is also desirable to minimize the overall weight of the vehicle and provide a body structure that absorbs some of the energy of the impact. Therefore, it is desirable for a vehicle support structure to be simple to manufacture and provide strength and rigidity to protect passengers in the event of a rear impact.

In view of the above, it will be apparent to those skilled in the art from this disclosure that there exists a need for an improved vehicle support structure. This invention addresses this need in the art as well as other needs, which will become apparent to those skilled in the art from this disclosure.

SUMMARY OF THE INVENTION

One object of the present invention is to provide a unitized vehicle rear body structure with additional structural protection to a fuel tank of a vehicle.

Another object of the present invention is to provide a unitized vehicle rear body structure with structural rigidity in select areas (e.g., jack points, seat attachment points, etc.) of a vehicle.

Accordingly, one aspect of the present invention is to provide a unitized vehicle rear body structure with a vehicle floor and a pair of structural support members. The structural support members are fixed to the vehicle floor and extend longitudinally within the vehicle rear body structure. Each of the structural support members includes a generally U-shaped support element and an upper brace. The U-shaped support element has a lower wall portion, and a pair of generally vertical side wall portions with laterally spaced apart upper edges and lower edges coupled to lateral sides of the lower wall portion. The upper brace is fixedly attached between the side wall portions. The upper brace is spaced apart upwardly from the lower wall portion and spaced below the upper edges.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 5 is a top plan view of one of the structural support members of the rear body structure in FIG. 3 in accordance with the present invention;

FIG. 6 is a side elevational view of the structural support member illustrated in FIG. 5 along with the fuel tank and a suspension cross member of the rear body structure in accordance with the present invention;

FIG. 14 is a cross-sectional view of the structural support member taken along section line 14-14 in FIG. 6 in accordance with the present invention;

FIG. 15 is a cross-sectional view of the structural support member taken along the line 15-15 in FIG. 6 in accordance with the present invention;

FIG. 18 is a cross-sectional view of the structural support member taken along section line 18-18 in FIG. 6 in accordance with the present invention; and FIG. 19 is a cross-sectional view of the passenger seat anchor member and a portion of the structural support member taken along section line 19-19 in FIG. 17, in accordance with the present invention.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
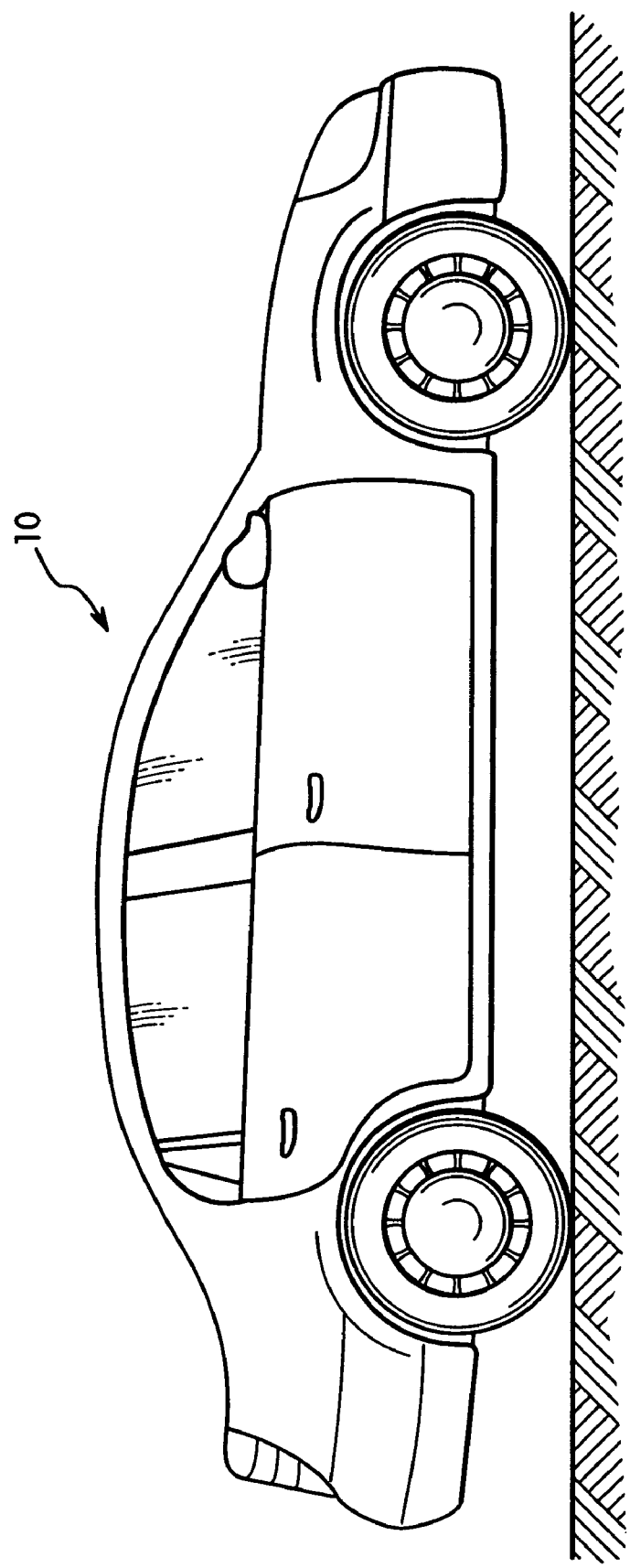
FIG. 1 is a side elevational view of a vehicle having a vehicle support structure in accordance with a preferred embodiment of the present invention.
Figure 2:
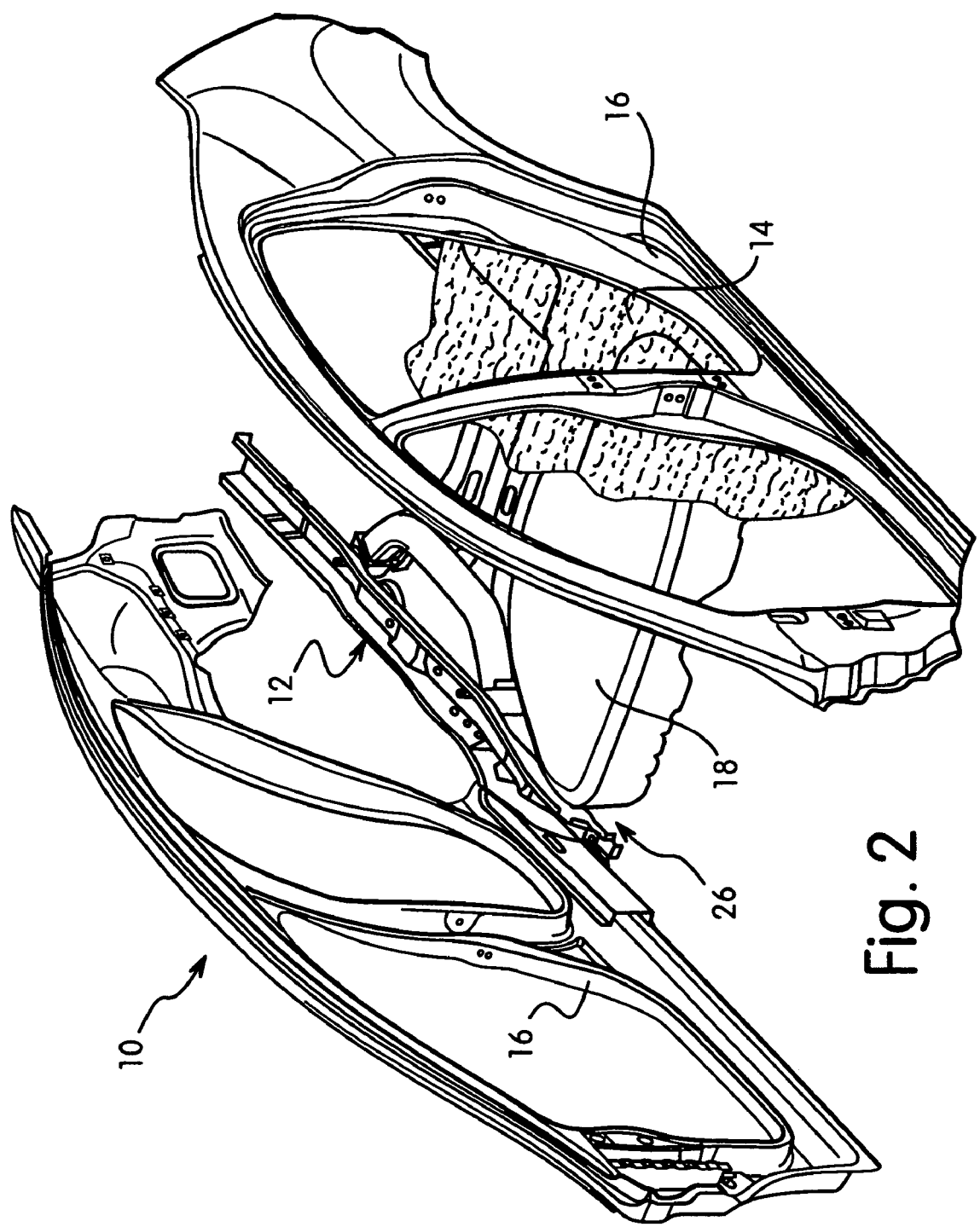
FIG. 2 is a partial perspective view of selected portions of the vehicle illustrated in FIG. 1 that shows a vehicle floor, a pair of outer body side portions, a rear body structure and a fuel tank with other selected portions of the vehicle removed for greater clarity in accordance with the present invention.

Referring initially to FIG. 1, a vehicle 10 is illustrated having a unibody vehicle structure in accordance with a first embodiment of the present invention. As shown in FIG. 2, the vehicle 10 includes, among other things, a rear body structure 12, a vehicle floor 14 interconnecting a pair of outer side body portions 16 with a fuel tank 18 disposed therebetween. It should be appreciated that many body portions, drive train portions and suspension portions have been removed in FIG. 2 to provide greater clarity. Further, only those portions of the vehicle 10 that assist in understanding the scope of the invention are described below, with description of conventional portions of the vehicle 10 left out for brevity.

The rear body structure 12 is configured to support and protect the fuel tank 18. Specifically, in response to a rear end impact or collision, the rear body structure 12 is configured and arranged such that the rearmost section of the rear body structure 12 will collapse, while the center and front portion will resist collapsing to avoid the fuel tank 18 from be crushed. In other words, specific rearward portions of the rear body structure 12, as explained below, are less rigid than portions of the rear body structure 12 proximate the fuel tank 18. As a result, those rearward portions of the rear body structure 12 more easily collapse or crumple in a rear end impact than do the portions of the rear body structure 12 proximate the fuel tank 18.

In the vehicle 10, the vehicle floor 14 is supported by and attached to portions of the rear body structure 12. The vehicle floor 14 is also attached to other structural elements of the vehicle 10, such as the outer side body portions 16. The outer side body portions 16 are fixed to the rear body structure 12 in a conventional manner. The fuel tank 18 is supported by the vehicle floor 14 by fasteners (not shown). Alternatively the fuel tank 18 can be supported directly by the rear body structure 12 or by a combination of the vehicle floor 14 and the rear body structure 12. As indicated in FIG. 2, the fuel tank 18 is positioned under the vehicle floor 14. In any event, the precise construction of the vehicle floor 14, the outer side body portions 16 and the fuel tank 18 and their precise connection to the rear body structure 12 are not importation to the rear body structure 12 of the present invention. Thus, structures and arrangements will not be discussed or illustrated in detail herein.

Figure 3:
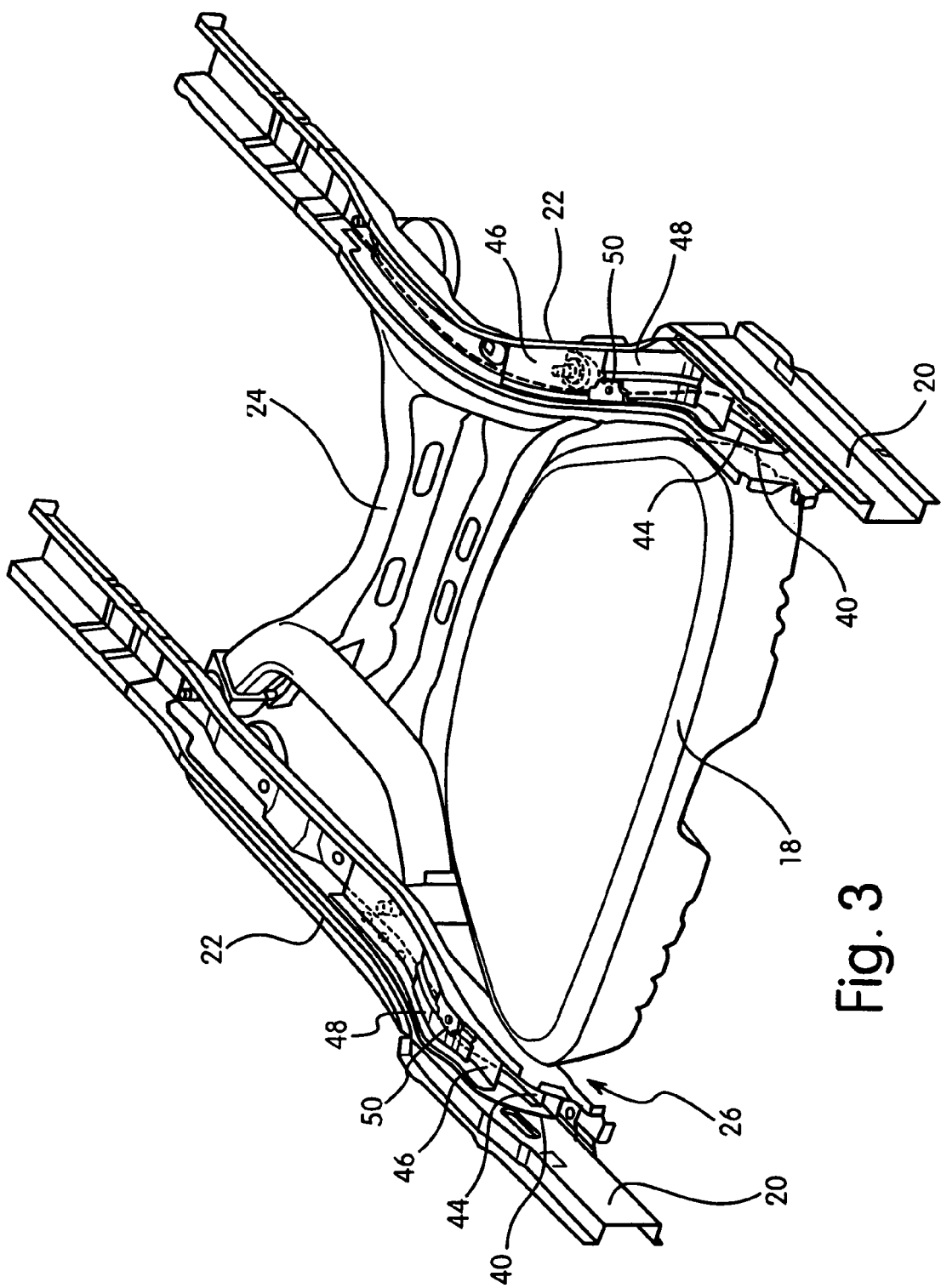
FIG. 3 is a partial perspective view of the rear body structure and the fuel tank illustrated in FIGS. 1 and 2, with other portions of the vehicle removed for greater clarity in accordance with the present invention.
Figure 4:
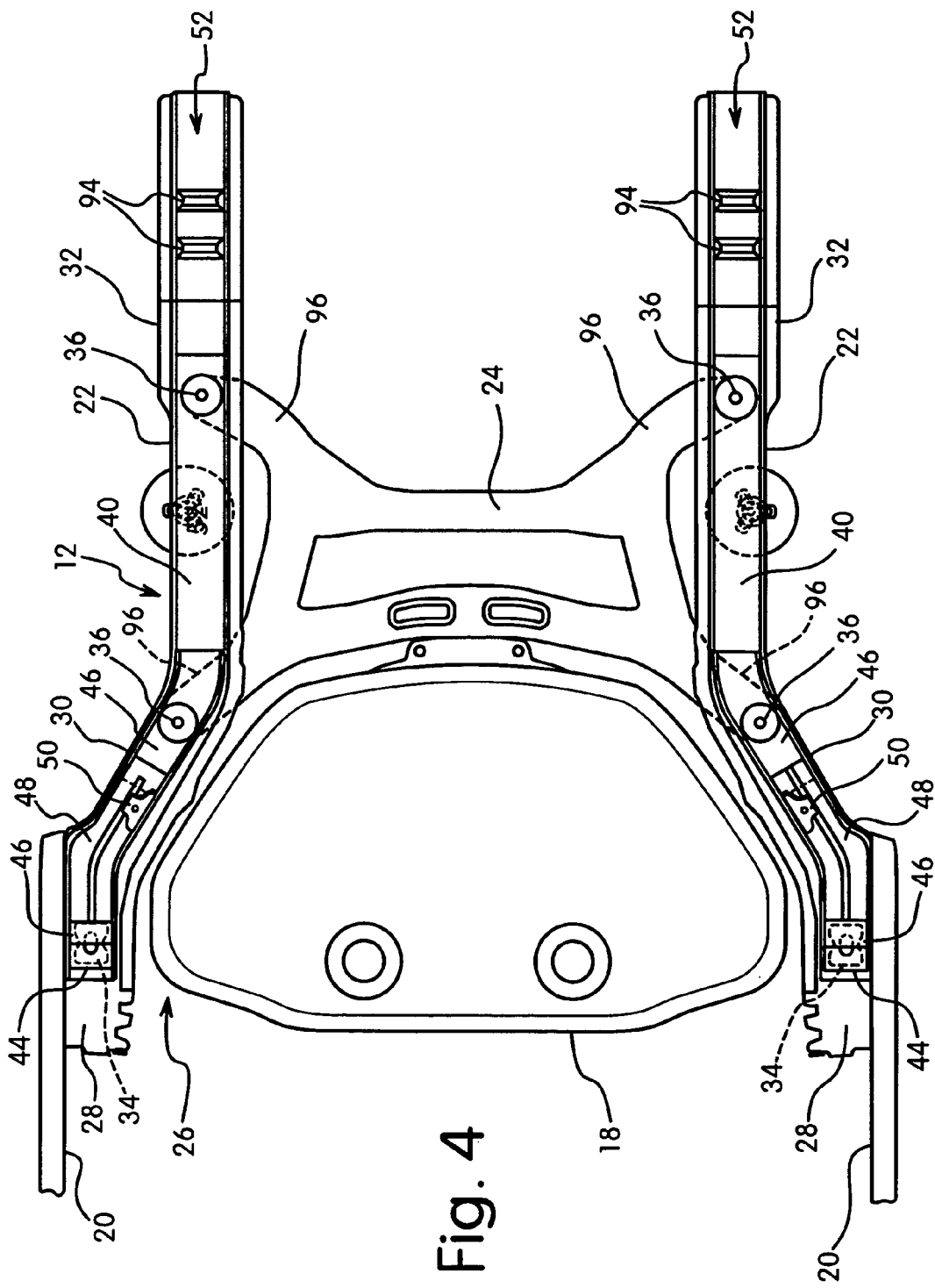
FIG. 4 is a top plan view of the rear body structure and the fuel tank illustrated in FIG. 3 in accordance with the present invention.

Referring now to FIGS. 3 and 4, the rear body structure 12 and the fuel tank 18 are shown completely removed from other portions of the vehicle 10. The rear body structure 12 basically includes, among other things, a pair of sill extension members 20, a pair of structural support members 22 and a cross member 24. These parts are formed from a sheet metal material that is typically used for a unitized body. Of course, other materials can be used as needed and/or desired. The pair of structural support members 22, the cross member 24 and the vehicle floor 14 (shown in FIG. 2) define a fuel tank receiving space 26 that extends laterally between forward portions of the structural support members 22 and below the vehicle floor 14. As such, a majority of the tank receiving space 26 is located directly laterally between forward areas of the structural support members 22. As will become apparent from this disclosure, the fuel tank 18 is protected by the forward areas of the structural support members 22.

Each of the sill extension members 20 is substantially a structural mirror image of the other. Therefore, description of one applies to the other. Consequently, only one sill member 20 is described in detail for brevity. One of the sill extension members 20 is shown in FIGS. 2, 3, 4 and 7. Each sill member 20 is fixedly attached to a corresponding one of the outer body side portions 16 by, for example, welding, as indicated in FIG. 2. Each sill member 20 is further fixed to a corresponding one of the structural support members 22, as indicated in FIGS. 3 and 4. Each sill member 20 has a U-shaped cross-section that extends from at least a midportion of a door opening in the outer body side portions 16 to the corresponding structural support member 22, as shown in FIGS. 2, 3 and 4.

Each of the pair of structural support members 22 is substantially structural mirror image of the other. Therefore, description of one applies to the other. Consequently, only one structural support members 22 is described in detail. Each structural support member 22 forms a primary supporting element for the rear portion of the vehicle 10 extending longitudinally within the vehicle rear body structure 12. Along its longitudinal length, each structural support member 22 has a sill section 28, a suspension support section 30 and a rear support section 32, as shown in FIGS. 5 and 6.

The sill section 28 has a generally straight overall contour extending horizontally and includes a jack point support structure 34. The jack point support structure 34 is a reinforced area of the sill section 28, as shown in FIGS. 5 and 6. As shown in FIGS. 2, 3 and 4, the sill extension member 20 is fixed to the sill section 28 by, for instance, spot welding or other welding techniques.

The suspension support section 30 includes a pair of longitudinally spaced suspension mounting structures 36 disposed rearwardly from the jack point support structure 34. The suspension support section 30 has a some what serpentine-like shape. Specifically, the suspension support section 30 has a shaped overall contour extending laterally inwardly and upwardly in a rearward direction from the sill section 28 toward a rear end of the structural support member 22. The rear support section 32 is described in greater detail below.

Figure 7:
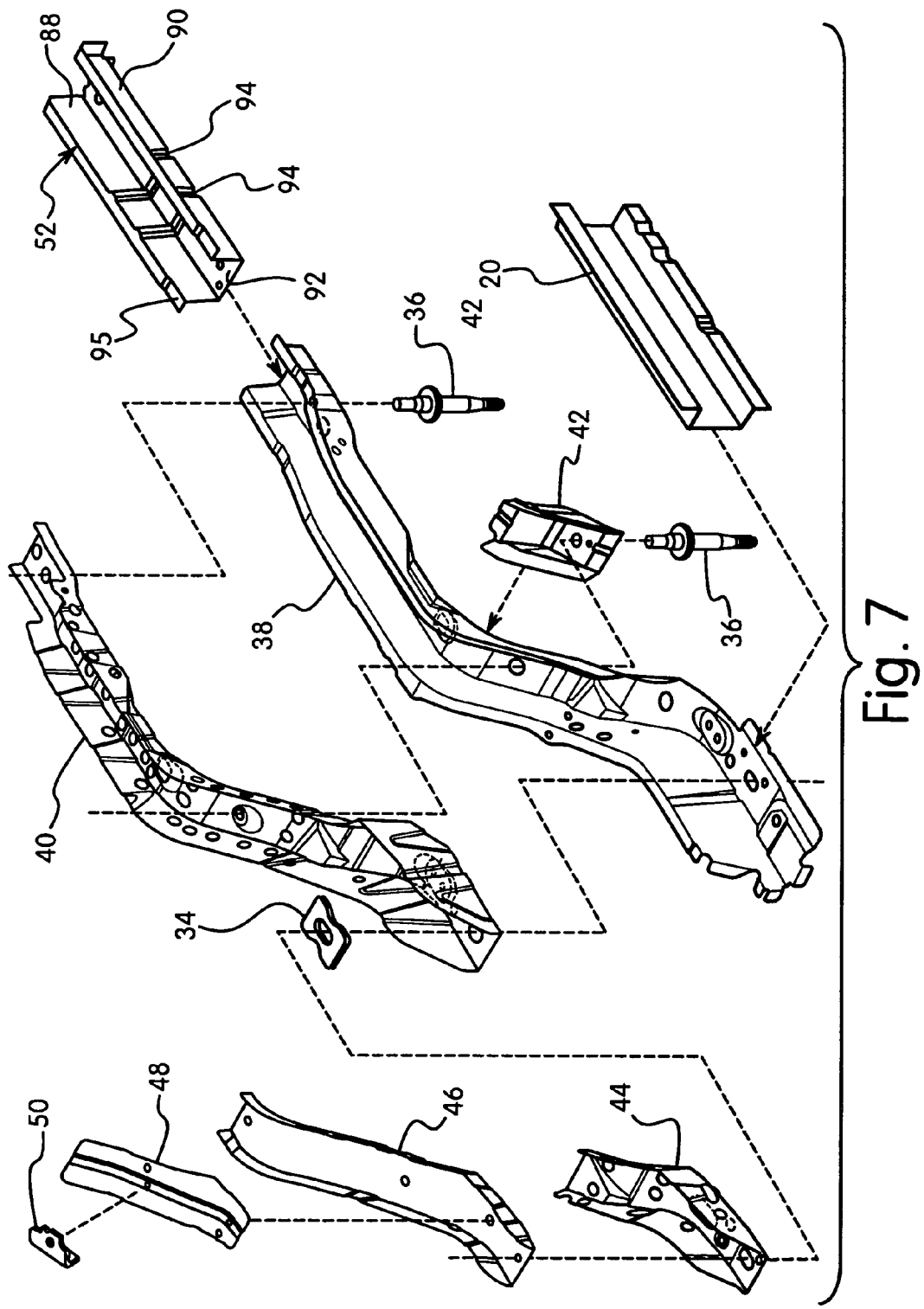
FIG. 7 an exploded perspective view of various elements that form one of the structural support members of the rear body structure illustrated in FIGS. 3-6 in accordance with the present invention.

As shown in FIG. 7, each of the structural support members 22 includes a plurality of elements that are connected to one another by, for instance, various welding techniques. Although not necessary a part of the structural support member 22, the sill extension member 20 is also shown in FIG. 7. The structural support member 22 basically includes a main support 38, a secondary support 40, a suspension bracket 42, a lower brace 44, an upper brace 46, a reinforcement plate 48, a passenger seat anchor member 50 and a rear support member 52.

Figures 8, 9:
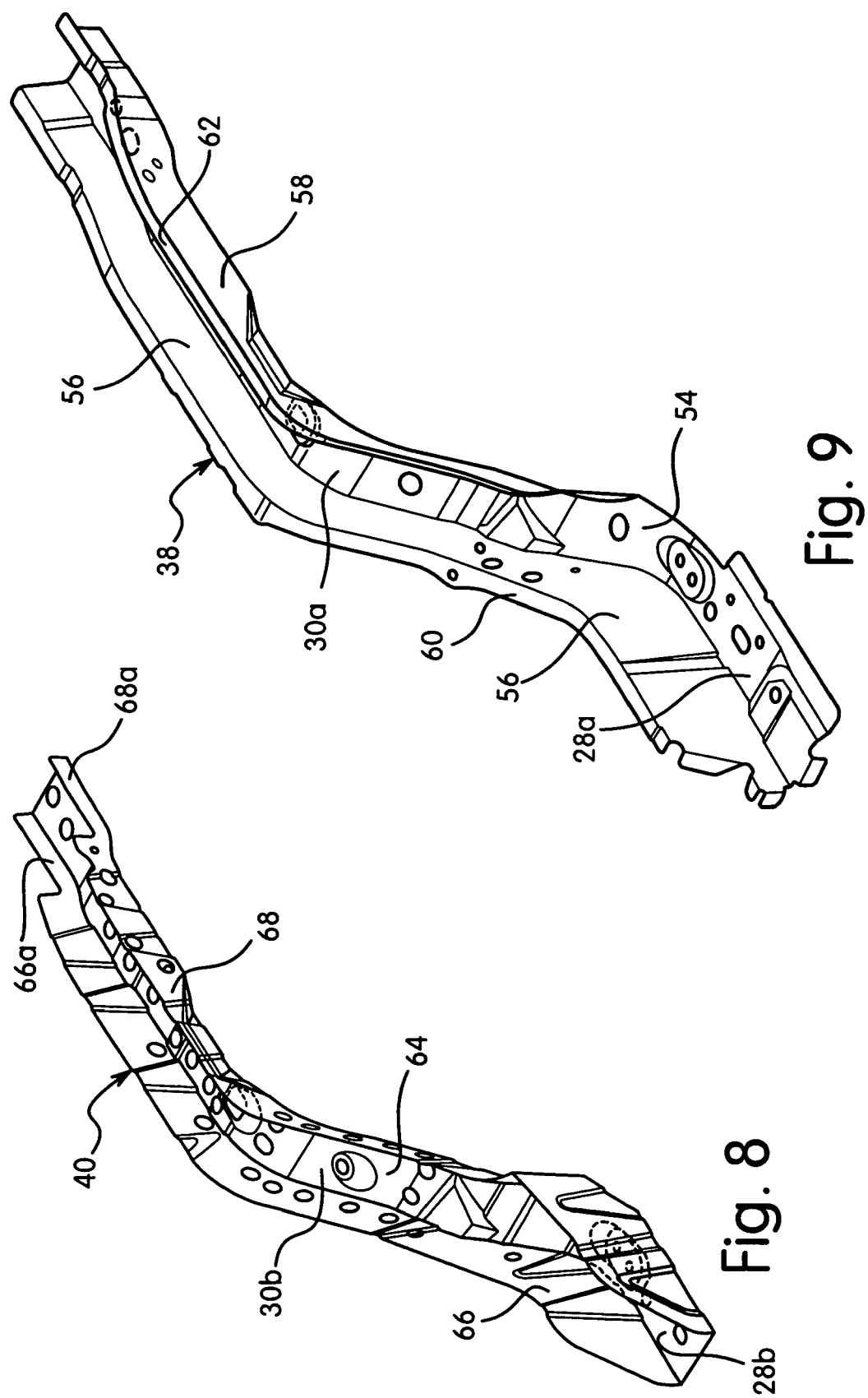
FIG. 8 is a perspective view of the secondary support that forms the upper wall of the structural support member illustrated in FIG. 7 in accordance with the present invention.
FIG. 9 is a perspective view showing of the main support that forms the lower wall of the structural support member illustrated in FIGS. 3-8 in accordance with the present invention.

The main support 38 is an elongated member that extends from the sill portion 28 of the structural support members 22 through the suspension support section 30, as shown in FIGS. 7 and 9. Further, the main support 38 includes a sill portion 28a that partially defines the sill portion 28, and a suspension support section 30a that partially defines the suspension support section 30 of the structural support members 22. The main support 38 is basically formed with a lower wall portion 54, a first lateral side 56 and a second lateral side 58. The lower wall portion 54 has a curved contour that is serpentine-like, as shown in FIGS. 5, 6, 7 and 9. The lower wall portion 54 is formed with several apertures, suspension support areas and support formations to accommodate suspension elements and reinforce the jack point support structure 34.

The first lateral side 56 of the main support 38 extends along an inboard side of the lower wall portion 54. The first lateral side 56 extends generally the entire of the length of the lower wall portion 54, except for a small forward area of the sill portion 28a, as shown in FIG. 9. The first lateral side 56 is formed with a first gusset 60 that generally extends the entire length of the upper edge of the first lateral side 56 in an inboard direction. Typically, the vehicle floor 14 is fixed to portions of the first gusset 60, as indicated in FIGS. 14 and 15.

The second lateral side 58 of the main support 38 extends along an outboard side of the lower wall portion 54. The second lateral side 58 only extends a portion of the length of the lower wall portion 54. Specifically, the second lateral side 58 extends primarily from the suspension support section 30 to the rear support section 32 of the main support 38. The second lateral side 58 is absent in the region of the sill portion 28a. The second lateral side 58 is formed with a second gusset 62 that generally extends from the upper edge of the second lateral side 58 in an outboard direction, and can be fixed to the vehicle floor 14.

The secondary support 40 is also an elongated member that extends from a mid-portion of the sill portion 28 of the structural support members 22 through the suspension support section 30, as shown in FIGS. 7 and 8. Further, the secondary support 40 includes a sill portion 28b that partially defines the sill portion 28, and a suspension support section 30b that partially defines the suspension support section 30 of the structural support members 22.

The secondary support 40 is basically formed with a lower wall portion 64, a first lateral side 66 and a second lateral side 68. The lower wall portion 64 has a curved contour that is serpentine-like in a manner similar to the shape of the lower wall portion 54 of the main support 38. The lower wall portion 64 is formed with several apertures, suspension support areas and support formations to accommodate various suspension elements and reinforce the jack point support structure 34. As indicated in FIG. 7, the secondary support 40 is slightly shorter than the main support 38.

The first lateral side 66 of the secondary support 40 extends along an inboard side of the lower wall portion 64. The first lateral side 66 extends generally from just forward from the jack point support structure 34 of the sill portion 28 through most of the suspension support section 30, as shown in FIGS. 7 and 8. A rear end 66a of the first lateral side 66 has a truncated height, as shown in FIG. 8.

The second lateral side 68 of the secondary support 40 extends along an outboard side of the lower wall portion 64. The second lateral side 68 extends the entire of the length of the lower wall portion 64. The second lateral side 68 is longer that the second lateral side 58 of the main support 38. Further, the second lateral side 68 extends partially through the length of the sill portion 28. As indicated in FIG. 14, a portion of the sill extension member 20 is fixedly attached to the second lateral side 68, by spot welding or other welding technique. A rear end 68a of the second lateral side 68 has a truncated height, as shown in FIG. 8.

The main support 38 and the secondary support 40 together form a basic support element that serves as a backbone of the structural support member 22. Further, the main support 38 and the secondary support 40 are nested together and extend at least along the suspension support section 30 of the structural support member 22. The main support 38 and the secondary support 40 together provide the structural support member 22 with a generally U-shaped cross-section, as shown in FIGS. 14, 15, 16, 17 and 18.

When considered together, the main support 38 and the secondary support 40 have an overall height that varies throughout the length of the structural support member 22. For instance, proximate the jack point support structure 34 the structural support member 22 has an overall height $H_1$, as shown in FIG. 15. At a point proximate a forward one of the suspension mounting structure 36, the structural support member 22 has an overall height $H_2$, as shown in FIG. 16.

Figure 16:
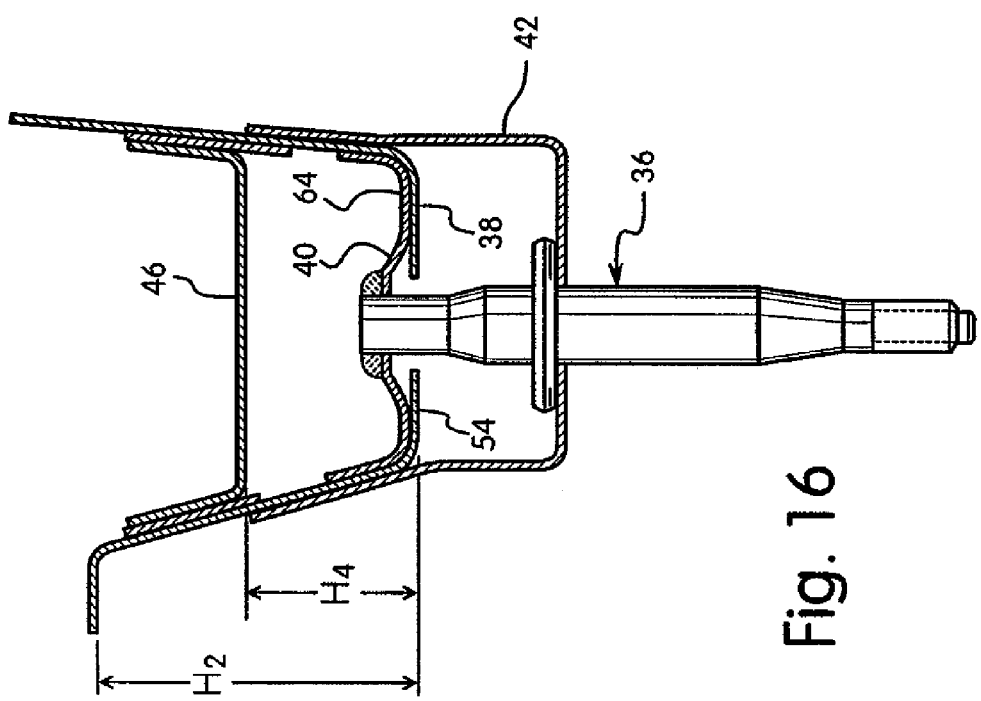
FIG. 16 is a cross-sectional view of the structural support member taken along section line 16-16 in FIG. 6 in accordance with the present invention.

The suspension bracket 42 is fixedly attached to the underside of the main support 38 of the structural support member 22 by spot welding or other welding techniques, as shown in FIGS. 6, 7 and 16. The suspension bracket 42 provides further support for the suspension mounting structures 36 and cross member 24.

Figure 10:
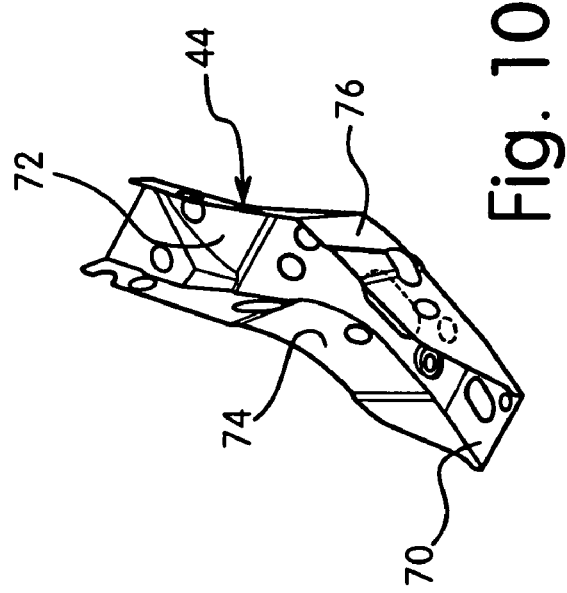
FIG. 10 is a perspective view of the lower brace of the structural support member illustrated in FIGS. 3-8 in accordance with the present invention.

The lower brace 44 is shorter than either of the main support 38 and the secondary support 40, as shown in FIGS. 7 and 10. The lower brace 44 serves to reinforce the transition between the sill section 28 and the suspension support section 30 of the structural support members 22. The lower brace 44 also provides strength to the jack point support structure 34.

The lower brace 44 is positioned between the first lateral side 66 and second lateral side 68 of the secondary support 40, as shown in FIGS. 14 and 15. The lower brace 44 is further disposed beneath the upper brace 48 extending from proximate the jack point support structure 34 to at least a mid area of the upper brace 48. The lower brace 44 has a generally U-shaped transverse cross-section.

The lower brace 44 basically includes a lower wall 70, an upper wall 72, a first lateral wall 74, and a second lateral wall 76. The lower wall 70 extends partway along the length of the sill section 28 beginning from an area at the forward portion of the jack point support structure 34 to an area proximate the cross member 24, as indicated in phantom lines in FIG. 6. As shown in FIG. 14, a forward portion 70a of the lower wall 70 is fixedly attached to the lower wall portion 64 of the secondary support 40. However, as shown in FIG. 15, a rearward portion 70a of the lower wall 70 is space apart from an adjacent portion of the lower wall portion 64 of the secondary support 40. Portions of the upper wall 72 are fixedly attached to a portion of the lower wall portion 64 of the secondary support 40, as indicated in FIG. 6. The first and second side walls 74 and 76 of the lower brace 44 are fixedly attached to respective first and second side walls 66 and 68 of the secondary support 40 by spot welding, or other welding techniques.

Figure 11:
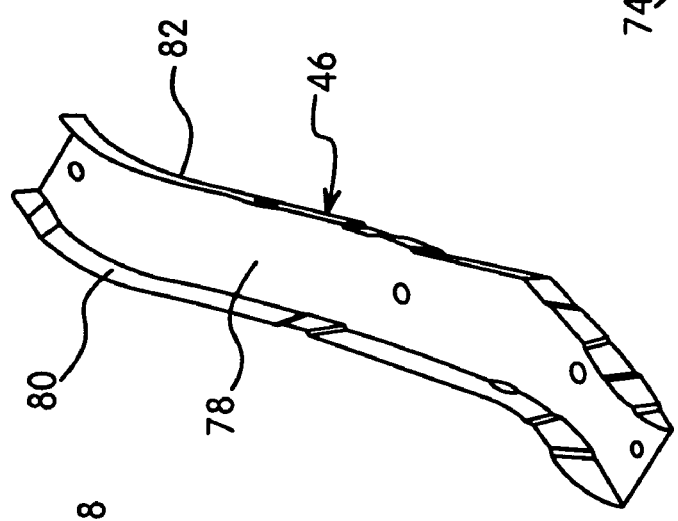
FIG. 11 is a perspective view of the upper brace of the structural support member illustrated in FIGS. 3-8 in accordance with the present invention.
Figure 12:
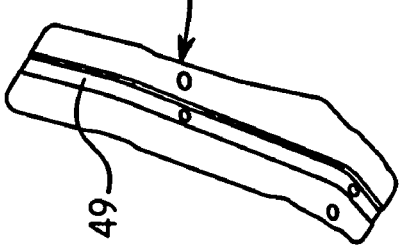
FIG. 12 is a perspective view of the reinforcement plate of the structural support member illustrated in FIGS. 3-8 in accordance with the present invention.
Figure 17:
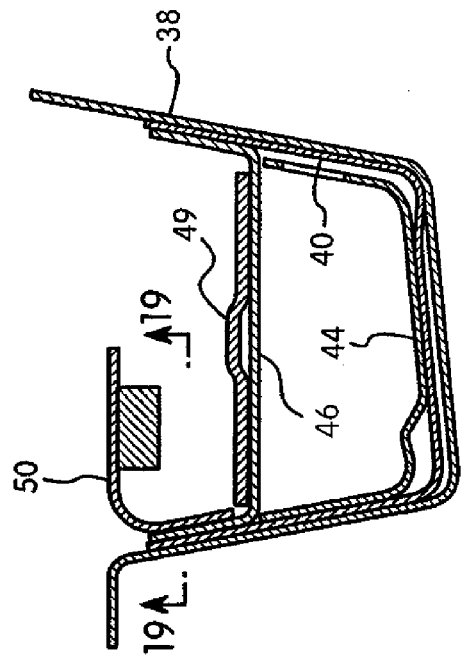
FIG. 17 is a cross-sectional view of the structural support member taken along section line 17-17 in FIG. 5 in accordance with the present invention.

As shown in FIG. 11, the upper brace 46 is a contoured plate member that is longer than the lower brace 44 and has a U-shaped cross-section, as shown in FIGS. 15, 16 and 17. The upper brace 46 extends from proximate the jack point support structure 34 of the sill section 28 of the structural support members 22 to a portion of the suspension support section 30 just rearward of a forward one of the suspension mounting structures 36, as shown phantom in FIG. 6.

The upper brace 46 basically includes a lower wall 78, a first side wall 80 and a second side wall 82. The lower wall 78 basically serves as a base of the upper brace 46 and extends the length of the upper brace 46 and has a contoured shape that is serpentine-like, corresponding to the shape of the structural support member 22. Within the structural support members 22, the lower wall 78 is spaced apart from the lower wall portions 54 and 64 by a height $H_3$, as shown in FIG. 15. At a point proximate a forward one of the suspension mounting structure 36, the lower wall 78 is spaced apart from the lower wall portions 54 and 64 by a height $H_4$, as shown in FIG. 16. The height $H_3$ is at least half or more of the height $H_1$ in FIG. 15. The height $H_4$ is at least half or more of the height $H_2$ in FIG. 16. Further, the lower wall 78 of the upper brace 46 is disposed above the lower wall portions 54 and 64 of the structural support member 22 at a point that is at least approximately half of an overall average height of the structural support member 22 where the upper brace is located, as indicated in FIGS. 15 and 16.

The first and second side walls 80 and 82 extend upwardly from the lower wall 78 and serve as gussets that are fixedly attached to the first and second side walls 66 and 68 of the secondary support 30 by spot welding, or other welding techniques, as shown in FIGS. 15, 16 and 17. As shown in FIGS. 15, 16 and 17, upper edges of the first and second side walls 80 and 82 of the upper brace 46 are spaced apart from the upper edges of the first and second side walls 66 and 68 of the secondary support 30. Specifically, the upper brace 46 is completely confined within a space defined by the lower and side walls of the structural support members 22 Regardless, the lower wall 78 is spaced apart from the lower walls 54 and 64 along its entire length.

The reinforcement plate 48 is fixedly attached to the base or lower wall 78 of the upper brace 46. The reinforcement plate 48 is arranged generally parallel to the lower walls 54 and 64 of the main and secondary supports 38 and 40 of the structural support members 22. The reinforcement plate 48 is a contoured plate member that is approximately the same length as the lower brace 44 but is spaced apart from the lower brace 44, as shown in FIG. 17. The reinforcement plate 48 is formed with a reinforcing rib 49 that extends along the entire length of the reinforcement plate 48. The reinforcement plate 48 extends from a point rearward from the jack point support structure 34 of the sill section 28 of the structural support members 22 to a point just above a forward one of the suspension mounting structures 36, as shown phantom in FIG. 6.

Figure 13:
FIG. 13 is a perspective view of the passenger seat anchor member of the structural support member illustrated in FIGS. 3-8 in accordance with the present invention.

The passenger seat anchor member 50 is an L-shaped bracket as shown in FIGS. 13, 17 and 19. The passenger seat anchor member 50 is fixedly attached to at least the first side wall 80 of the upper brace 46, and preferably also to at least the first lateral side 66 of the structural support members 22, as shown in FIG. 19. The passenger seat anchor member 50 is preferably welded to the first side wall 80 of the upper brace 46 by at least a spot weld 84. However, the passenger seat anchor member 50 can also be welded to the first side wall 80 of the upper brace 46, the first lateral side 66 of the secondary support 40 and the first lateral side 56 of the main support 38 of the structural support members 22 by another weld 86 or welds 86. The welds 86 bond the passenger seat anchor member 50, the first side wall 80, the first lateral side 66 and the first lateral side 56 together, as shown in FIG. 19. As such, the spot weld 84 that does not secure the passenger seat anchor member 50 to the first lateral side 56.

As shown in FIGS. 4, 5, 6 and 7, the rear support member 52 basically define the rear support section 32 of the structural support member 22 extending rearwardly from the suspension support section 30. The rear support member 52 has a U-shaped cross-section that basically includes a first side wall 88, a second side wall 90 a lower wall 92, crumple portions 94 and a connection portion 95. The connection portion 95 of the rear support member 52 is fixedly attached to the rearward end of the main support 38 by any of a variety of welding techniques.

Each of the first and second side walls 88 and 90 are formed with gusset portions that are basically extensions of the first and second gussets 60 and 62 of the main support 38. The lower wall 92 forms an extension of the lower wall portion 54 of the main support 38.

The crumple portions 94 are ribs or arcuate recesses formed in the rear support member 52 that slightly weaken the rear support member 52 with respect to rear end collisions. Consequently, the rear support section 32 has less axial rigidity that the remainder of the structural support member 22, where the axial direction correspond the longitudinal length of the structural support member 22. As a result, in response to a rear impact on the vehicle 10, the rear support member 52 (and the rear support section 32) collapses and the rear support member 52 is less likely to collapse or deform. Therefore, the fuel tank 18 is protected as a result of such an impact. Specifically, the rear support section 32 of the structural support member 22 has an axial rigidity that is less than axial rigidity of the structural support member 22 in the sill section 28 and suspension support section 30. More specifically, the rear support section 32 of the structural support member 22 is arranged and configured to collapse more readily than the areas of the structural support member 22 having the upper brace 46 in response to a rear impact on the vehicle 10.

The cross member 24 is attached to each of the two structural support member 22. The cross member 24 forms a part of the suspension system (not shown) of the vehicle 10 and is attached to the structural support members 22 by the suspension mounting structures 36. The cross member 24 is located rearward from the fuel tank 18 and also partially defines the tank receiving space 28 along with the floor 14 and structural support members 22 thereby protecting the fuel tank 18. Forward portions of the cross member 24 are located directly laterally between areas of the structural support members 22 having the upper braces 46, as shown in FIGS. 5 and 6. Further, the suspension support section 30 includes at least the suspension mounting structures 36 with a frontmost pair of the suspension mounting structures 36 being located directly beneath the upper brace 46 and the rearmost pair of the suspension mounting structures being located rearwardly behind the upper brace 46.

As used herein to describe the above embodiment, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A unitized vehicle rear body structure comprising:
   a vehicle floor; and
   a structural support member fixed to the vehicle floor and extending longitudinally within the vehicle rear body structure, the structural support member forming a suspension support section, the structural support member including
   a generally U-shaped support element having a lower wall portion, and a pair of generally vertical side wall portions with laterally spaced apart upper edges and lower edges coupled to lateral sides of the lower wall portion,
   a suspension mounting structure mounted to the support element at the suspension support section, and
   an upper brace fixedly attached between the side wall portions, the upper brace having a transverse wall extending laterally between the side wall portions and disposed above an upper end of the suspension mounting structure, with the upper brace being spaced apart upwardly from the lower wall portion and spaced below the upper edges.

2. The unitized vehicle rear body structure as set forth in claim 1, wherein
   the structural support member is configured to form a sill section with a jack point support structure, and
   the suspension support section is disposed rearwardly from the jack point support structure.

3. The unitized vehicle rear body structure as set forth in claim 1, wherein
   the upper brace has a generally U-shaped transverse cross-section with side walls fixedly attached to the side wall portions of the support element.

4. The unitized vehicle rear body structure as set forth in claim 2, wherein
   the upper brace extends from proximate the jack point support structure to proximate the suspension support section.

5. The unitized vehicle rear body structure as set forth in claim 2, wherein
   the sill section has a generally straight overall contour extending horizontally, and
   the suspension support section has a shaped overall contour extending laterally inwardly and upwardly in a rearward direction from the sill section toward a rear end of the structural support member.

6. The unitized vehicle rear body structure as set forth in claim 1, wherein
   the upper brace is placed below the vehicle floor.

7. A unitized vehicle rear body structure comprising:
   a vehicle floor; and
   a structural support member fixed to the vehicle floor and extending longitudinally within the vehicle rear body structure, the structural support member including
   a generally U-shaped support element having a lower wall portion, and a pair of generally vertical side wall portions with laterally spaced apart upper edges and lower edges coupled to lateral sides of the lower wall portion, and
   an upper brace fixedly attached between the side wall portions, with the upper brace being spaced apart upwardly from the lower wall portion and spaced below the upper edges, the upper brace having a transverse wall extending laterally between the side wall portions, the transverse wall of the upper brace being disposed above the lower wall portion of the support element at a point that is at least one-half or more of an overall average height of the support element where the upper brace is located.

8. The unitized vehicle rear body structure as set forth in claim 7, wherein
   the upper brace has a generally U-shaped transverse cross-section with side walls fixedly attached to the side wall portions of the support element.

9. A unitized vehicle rear body structure comprising:
   a vehicle floor; and
   a structural support member fixed to the vehicle floor and extending longitudinally within the vehicle rear body structure, the structural support member including
   a generally U-shaped support element having a lower wall portion, and a pair of generally vertical side wall portions with laterally spaced apart upper edges and lower edges coupled to lateral sides of the lower wall portion,
   an upper brace fixedly attached between the side wall portions, with the upper brace being spaced apart upwardly from the lower wall portion and spaced below the upper edges, and
   a passenger seat anchor member fixedly attached to the upper brace and one of the side wall portions of the support element.

10. The unitized vehicle rear body structure as set forth in claim 9, wherein
    the upper brace is welded to the one of the side wall portions of the support element by at least one first weld; and
    the anchor member is welded to the upper brace by at least one second weld that does not secure the one of the side wall portions of the support element to the upper brace.

11. A unitized vehicle rear body structure comprising: a vehicle floor; and
    a structural support member fixed to the vehicle floor and extending longitudinally within the vehicle rear body structure, the structural support member forming a sill section and a suspension support section disposed rearwardly from the sill section, the structural support member including
    a generally U-shaped support element including a main support and a secondary support that are nested together, with at least both of the main and secondary supports extending along the suspension support section of the structural support member, at least one of the main and secondary supports having a lower wall portion, and a pair of generally vertical side wall portions with laterally spaced apart upper edges and lower edges coupled to lateral sides of the lower wall portion,
    an upper brace fixedly attached between the side wall portions, with the upper brace being spaced apart upwardly from the lower wall portion and spaced below the upper edges, and
    a jack point support structure fixed to the support element at the sill section.

12. A unitized vehicle rear body structure comprising:
    a vehicle floor; and a structural support member fixed to the vehicle floor and extending longitudinally within the vehicle rear body structure, the structural support member forming a sill section and a suspension support section disposed rearwardly from the suspension support section, the structural support member including a generally U-shaped support element having a lower wall portion, and a pair of generally vertical side wall portions with laterally spaced apart upper edges and lower edges coupled to lateral sides of the lower wall portion, an upper brace fixedly attached between the side wall portions, with the upper brace being spaced apart upwardly from the lower wall portion and spaced below the upper edges, a lower brace disposed beneath the upper brace, with the lower brace extending from proximate the jack point support structure to at least a mid area of the upper brace, and a jack point support structure fixed to the support element at the sill section.

13. The unitized vehicle rear body structure as set forth in claim 12, wherein the lower brace has a generally U-shaped transverse cross-section with side walls welded to the side wall portions of the support element.

14. A unitized vehicle rear body structure comprising:
a vehicle floor; and
a structural support member fixed to the vehicle floor and extending longitudinally within the vehicle rear body structure, the structural support member including a generally U-shaped support element having a lower wall portion, and a pair of generally vertical side wall portions with laterally spaced apart upper edges and lower edges coupled to lateral sides of the lower wall portion, and an upper brace fixedly attached between the side wall portions, with the upper brace being spaced apart upwardly from the lower wall portion and spaced below the upper edges, the upper brace having a generally U-shaped transverse cross-section with side walls fixedly attached to the side wall portions of the support clement, the upper brace including a reinforcement plate fixed to a base of the upper brace with the reinforcement plate being arranged generally parallel to the lower wall portion of the support element.

15. A unitized vehicle rear body structure comprising:
a vehicle floor; and
a structural support member fixed to the vehicle floor and extending longitudinally within the vehicle rear body structure, the structural support member forming a sill section and a suspension support section disposed longitudinally rearward of the sill section, the structural support member including a generally U-shaped support element having a lower wall portion, and a pair of generally vertical side wall portions with laterally spaced apart upper edges and lower edges coupled to lateral sides of the lower wall portion, an upper brace fixedly attached between the side wall portions, with the upper brace being spaced apart upwardly from the lower wall portion and spaced below the upper edges, a jack point support structure fixed to the support element at the sill section, and at least two spaced suspension mounting structures fixed to the support element at the suspension support section that is disposed rearwardly from the jack point support structure, with a frontmost one of the suspension mounting structures being located directly beneath the upper brace and a rearmost one of the suspension mounting structures being located rearwardly behind the upper brace.

16. A unitized vehicle rear body structure comprising:
a vehicle floor; and
a pair of structural support members fixed to the vehicle floor and extending longitudinally within the vehicle rear body structure, each of the structural support members forming a sill section and a suspension support section disposed longitudinally rearward of the sill section, each of the structural support members including a generally U-shaped support element having a lower wall portion, and a pair of generally vertical side wall portions with laterally spaced apart upper edges and lower edges coupled to lateral sides of the lower wall portion, an upper brace fixedly attached between the side wall portions, with the upper brace being spaced apart upwardly from the lower wall portion and spaced below the upper edges, a jack point support structure fixed to the support element at the sill section, and a pair of longitudinally spaced suspension mounting structures fixed to the support element at the suspension support section that is disposed rearwardly from the jack point support structure, the vehicle floor and the structural support members define a fuel tank receiving space extending laterally between the structural support members and disposed below the vehicle floor, with a majority of the tank receiving space being located directly laterally between areas of the structural support members having the upper braces.

17. The unitized vehicle rear body structure as set forth in claim 16, wherein
the structural support members are substantially structural mirror images each other.

18. The unitized vehicle rear body structure as set forth in claim 16, wherein
each of the structural support members includes a rear end structural support section extending rearwardly from a respective one of the suspension support sections, the rear end structural support portions having axial rigidities that are less than axial rigidities of areas of the structural support members having the upper braces such that the rear end structural support portions are arranged and configured to collapse more readily than the areas of the structural support members having the upper braces during a rear impact.

19. The unitized vehicle rear body structure as set forth in claim 16, wherein
each of the structural support members includes a rear end structural support section extending rearwardly from a respective one of the suspension support sections, the rear end structural support portions having axial rigidities that are less than axial rigidities of areas of the structural support members having the upper braces such that the rear end structural support portions are arranged and configured to collapse more readily than the areas of the structural support members having the upper braces during a rear impact.

20. The unitized vehicle rear body structure as set forth in claim 16, wherein
the upper braces are placed below the vehicle floor.

21. The unitized vehicle rear body structure as set forth in claim 16, wherein
each of the upper braces has a generally U-shaped transverse cross-section with side walls fixedly attached to the side wall portions of each of the support elements.

22. A unitized vehicle rear body structure comprising:
a vehicle floor; and
a pair of structural support members fixed to the vehicle floor and extending longitudinally within the vehicle rear body structure, each of the structural support members including
a generally U-shaped support element having a lower wall portion, and a pair of generally vertical side wall portions with laterally spaced apart upper edges and lower edges coupled to lateral sides of the lower wall portion, and
an upper brace fixedly attached between the side wall portions, with the upper brace being spaced apart upwardly from the lower wall portion and spaced below the upper edges, the upper brace having a transverse wall extending laterally between the side wall portions, the transverse wall of the upper brace being disposed above the lower wall portion of the support element at a point that is at least one-half or more of an overall average height of the support element where the upper brace is located.

* * * * *